Dec. 27, 1938.  G. H. REID  2,141,555
GYROSCOPIC AIRCRAFT INSTRUMENT
Filed Oct. 23, 1935  2 Sheets-Sheet 1

Inventor,
George H. Reid
Per,
Atty.

Dec. 27, 1938.  G. H. REID  2,141,555
GYROSCOPIC AIRCRAFT INSTRUMENT
Filed Oct. 23, 1935  2 Sheets-Sheet 2

Inventor,
George H. Reid
Per, [signature]
Atty.

Patented Dec. 27, 1938

2,141,555

UNITED STATES PATENT OFFICE 2,141,555

GYROSCOPIC AIRCRAFT INSTRUMENT

George Hancock Reid, London, England

Application October 23, 1935, Serial No. 46,391
In Great Britain October 29, 1934

3 Claims. (Cl. 33—204)

This invention relates to gyroscopic aircraft instruments, and more particularly to instruments containing a gyroscope mounting with resilient or similar restraint so as to show rate of turn. An object of the present invention is to utilize such an instrument in order to get to some extent the effect of an artificial horizon, that is to say, an indicator which with reference to a datum gives the user the same or similar information with regard to the attitude or behaviour of his aircraft as he would normally derive by observing the position of his aircraft relative to the earth's horizon or other external datum. It has previously been proposed, in order to simulate the horizon in an instrument, to provide a free gyro either itself acting as a horizon in the manner of a spinning top, or to use a so-called free gyro with connections to an appropriate indicator which might, for example, be a model aeroplane viewed against a simulation landscape background, or the indicator operated by the gyro might be such a simulation background and the datum a so-to-speak fixed model aeroplane. These prior proposals, however, mostly present the practical disadvantages commonly associated with free gyro systems. It is therefore an object of the present invention to derive some at least of the advantages of such instruments without necessarily involving the well-known disadvantages. An advantage sought by the present invention is to provide for an interrelationship of two indicators without the necessity for any mechanical or other undesirable connection between them such as might impair the efficiency of either of them. Further, the invention seeks to provide an instrument in which a very readily recognizable indication may be given of manoeuvres and to some extent of attitudes of aircraft, and it also seeks to provide improved constructional details.

According to this invention an instrument is provided with a restrained gyro (i. e. one capable of indicating rate of angular movement by precession) associated with an indicator which is adapted to be read in relation to a second indicator which is controlled by a gravitational device such as a pendulum, and hereinafter called a pendulum (which may be stable or unstable). Further the indicators may, according to this invention, be mounted for coaxial pivotal movement. This device may be provided in addition to any existing indicators such as neutrally vertical needles, but the sense of movement of the indicators in relation to the movements of the aircraft to which they correspond is selected so as to inform the pilot by simulation of the circumstances. To this end, if we regard the indicators as being for one part an indicator showing rate of turn, and for the other part, a second indicator tilting about virtually the same axis to indicate what may be called virtual bank, i. e. bank, verticality, or lateral acceleration, then the arrangement is preferably such that the first indicator in this case will tilt to the left when the aeroplane is turned or yawed to the left, and the second indicator associated with the pendulum will tilt apparently towards the right when the carrying aircraft is flying straight with left wing down, or is skidded to the left or is overbanked in a turn to the left. Furthermore, the indicators are preferably associated with fixed markings or neutral points on the casing or dial, disposed horizontally to show level and straight flight.

In one form of the invention, a gyroscopic turn indicator has its spindle (i. e. that part which would normally carry a pointer or the equivalent) equipped with a box-like structure, preferably annular in form, which itself carries a pendulous indicating device; and there is mounted concentrically upon the turn indicator spindle a sealed annular chamber having a partly transparent front, containing a liquid. This liquid may be used for the dual purpose of damping motion, and acting in itself as a liquid level. In so far as it acts as a liquid level it may be viewed directly. It does not follow that this is a true representation, but in most cases of actual flight the indication will be such as to inform the user of the proper control movements to sustain a required condition or alter that condition of flight.

The invention includes the novel constructional features of a complete instrument together with the arrangement of another form of the invention, and is explained in relation to the accompanying diagrammatic drawings, of which:—

Figure 1:
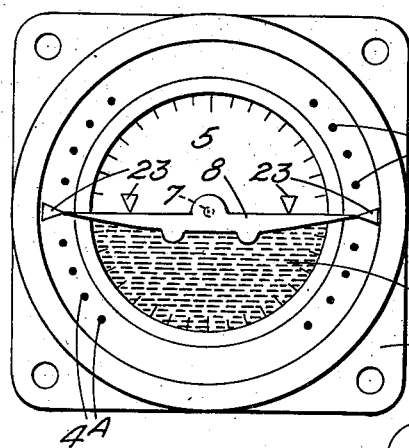
Figure 1 is a face view of an instrument employing the liquid lateral level, in neutral conditions or at rest.

The instrument comprises a hollow airtight casing 1 of substantially circular section. The otherwise open front end is enclosed by a glass window 2 secured by a bezel ring 3 with a packing 3A. Immediately within the window 2 is a second annular plate 4 of glass upon the front face of which any desired markings such as 4A are made, and to which is stuck or otherwise secured an annular sealed glass or transparent capsule 5, concentric with the window 2, and having a central aperture 5A. This capsule is sealed, and is half full of dark, preferably opaque liquid, at 6, which consequently has the appearance of diametrically dividing the capsule as seen in Figures 1 to 4. This liquid, acting pendulously, and having a narrow meniscus, forms a cross-level, and is responsive to lateral inclinations or accelerations. Through the aperture 5A there projects a spindle 7 carrying, between the parts 2 and 4, an indicator, preferably a silhouette 8 of an aeroplane seen head on.

The spindle 7 is rigid with a gimbal 9 which, in bearings at 10, supports an air-spun gyro rotor 11. The gimbal 9 is pivotally borne for example at 12 upon the rear arm 13 and front arm 14 of a fixed frame 15. A practically rigid, but yieldable, arm 16 is anchored on the frame 15 and is connected by a tension spring 17 to the gimbal 9, eccentric of the axis of bearing 12. A screw stud 18, accessible through a suction pipe connector 19, allows the arm 16 to be adjusted, so that the tension of spring 17 is adjustable, as may be requisite in practical use.

To the forward part of the gimbal ring 9 are pivotally connected a pair of piston rods 19 which operate pistons in dashpots 20 which are anchored on the arm 14.

The frame 15 is formed with a carefully machined feather or key along its lower surface, and this in assembly, is slid into a groove moulded in the internal wall of the casing 1, the frame 15 and consequently the whole gyro mechanism being then secured by screwing through the casing and into frame 15, a hollow plug 21 which (embodying any desired air filter or regulating valve) also acts as a jet bearing on the buckets of the rotor 11. Assembly and dismantling are rendered very simple by this construction.

The instrument so provided therefore presents a dial or face which will have the appearance as shown in Figures 1 to 4. The indicator 8, by movements about its axis and relative to the indications 23, shows rate of turn. The indication provided by the level of the liquid 6 is one of attitude and/or lateral acceleration. In examining Figures 1 to 4 it should be observed that the casing of the instrument is shown as having attachment lugs such as 22, and the position of these lugs in the respective figures shows whether the whole instrument is supposed to be tilted or not, i. e. shows how the carrying aircraft is deemed to be tilted. Figure 1 then, represents straight and level flight, and the indications which may be emphasized by luminized or other conspicuous marks such as 23, are perfectly plain and natural and simulate the silhouette of an aeroplane flying exactly aligned with the horizon.

Figure 2:
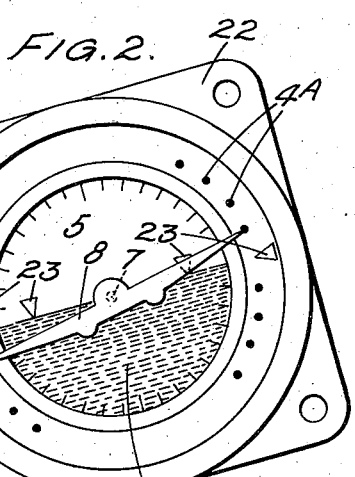
Figure 2 is a like view of the same instrument in a certain flight condition.
Figure 3:
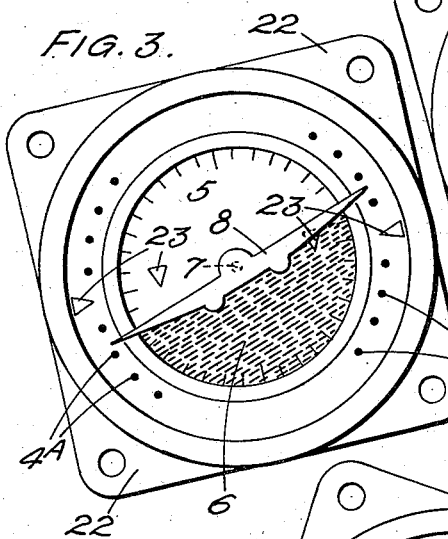
Figures 3 and 4 show different conditions.

Turning now to Figure 2, it can be seen that the carrying aeroplane is intended to be banked, and it can also be seen that the aeroplane is turning or yawing to the left because the indicator 8 is tilted relative to the indications 23, the degree of indication corresponding to the rate of turn to the left. It will be noted that the level of the liquid 6 is still aligned with the markings 23, and thus that apparent gravity within the aeroplane is still vertical or normal to the attitude of the aeroplane laterally, and this of course indicates that the proper degree of bank is being employed, i. e. that there is no skid or sideslip. Whenever the liquid level coincides with the horizontal markings such as 23, the bank is necessarily correct in the academic sense. It may well be, however, that the pilot wishes to use a skidded turn with the rate of turn and amount of skid in a definite relationship. This condition follows in a sense from that of Figure 2, and can be achieved by forcing the aeroplane to skid, whereupon the level of the liquid 6 can be aligned with the indicator 8, and the condition will then be as seen in Figure 3, wherein the aeroplane is banked as in Figure 2, the same rate of turn appears as in Figure 2, but an indication of skid is afforded by the fact that the liquid level is now aligned with the turn indicator element 8. It will be noted that this form of indication is highly convenient, and amounts simply to the pilot applying his desired rate of turn and then keeping the small aeroplane as it were on the horizon, which is precisely what he is required to do in the level flight condition shown in Figure 1. This procedure will result in precisely the sort of skidded turn which is deemed to be the most suitable for general instrument flying purposes.

Figure 4:
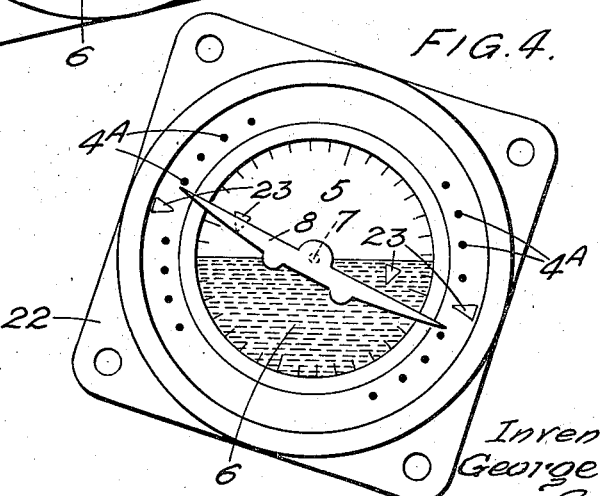
Figure 5:
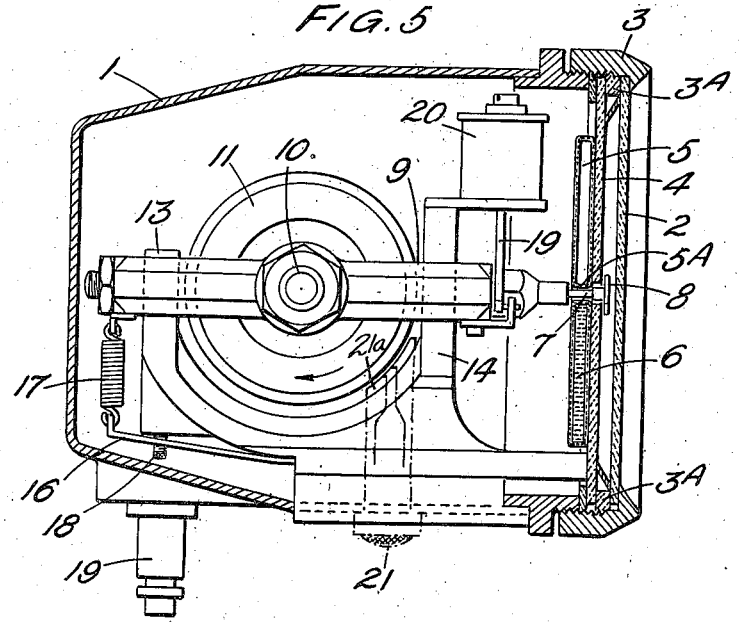
Figure 5 is a side elevation partly in section, showing the constructional features.
Figure 6:
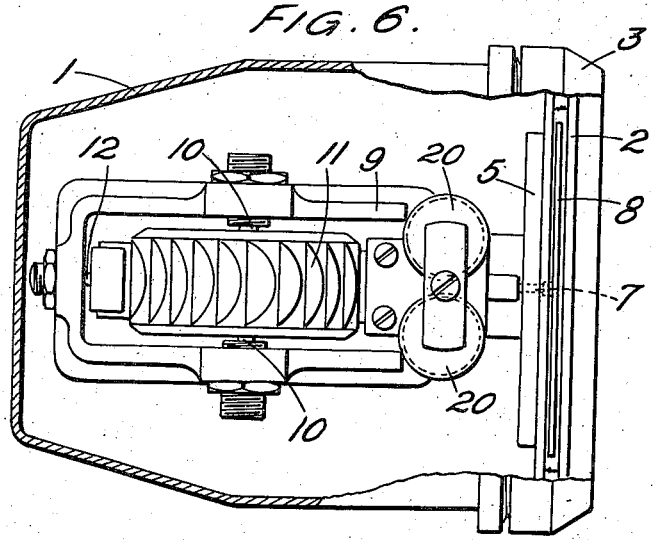
Figure 6 is a like plan view.

Figure 4 illustrates a condition which will probably never arise in actual flight, but may be of interest functionally. In this case the manoeuvre corresponding to the instrument indication can be deduced. It is evident in the first place that the carrying aeroplane is turning gently to the right; it is equally evident, from the attitude of the level of the liquid 6, that there is practically no centrifugal or other component outwards from the axis of the turn, for the level is practically horizontal. This indicates that the carrying aeroplane is sidesliping inwards towards the axis of the turn to a very considerable degree, i. e. that there is, academically, too much bank on for the amount of turn. The attitude of the carrying aeroplane as envisaged by the lugs 22 and marks 23, bears this out, where it can be seen that the rate of turn is in fact fairly small, but the tilting of the whole instrument relative to the horizontal, to the right, is relatively large.

It should be observed that the direction of rotation of the gyro rotor 11 is selected so that the indicator 8 will tilt in the required way. In some circumstances, where for example it is desired to connect the indicator 8 with the known type of turn indicator in which a downwardly pointing needle shows rate of turn by pointing in the appropriate direction, reversing linkage or other means may be introduced to allow that the two indications move in opposite sense.

It is of course entirely possible to substitute for the liquid 6 an indicator in the form of a semi-circular sheet of metal or the like suitably suspended on a bar and suitably ballasted and damped so as to be pendulous and to give indications of exactly the same order as those indicated above.

In yet another potential modification, the capsule 5 is carried on the spindle 7 and the silhouette or other representation 8 can then be inscribed on the front of the capsule, which as a whole may be regarded as the turn indicator pointer, and the pendulous liquid or perhaps a mechanical pendulum damped by transparent liquid within the capsule may be provided, and it may be found possible to arrange for suitable damping effects as between the turn indications and the pendulous action.

What I claim is:—

1. An instrument for aircraft comprising a casing, means for partially evacuating the casing, a two-degree-of-freedom, constrained rate-of-turn gyro within said casing, a jet in said casing for spinning said gyro, a transparent circular air-tight closure forming an end wall of said casing substantially coaxial with the axis of precession of said gyro, a circular transparent walled capsule within said closure, indicating liquid half filling said capsule, a turn indicator element between said capsule and said closure, and a spindle connection between the precession axis of said gyro and said indicator, said connection passing through said capsule substantially concentric thereof.

2. An instrument for the purpose described having a turn indicator which is horizontal when in neutral position and angularly movable anti-clockwise for a left hand turn and vice versa about a central axis of symmetry, and a pendulously moved horizon indicator co-axial with the turn indicator and comprising a meniscus of liquid level adapted to move angularly and symmetrically with the turn indicator, said meniscus comprising a transparently walled substantially circular capsule arranged concentrically with the said central axis of symmetry and approximately half filled with the indicating liquid.

3. An instrument for the purpose described having a turn indicator which is horizontal when in neutral position and angularly movable anti-clockwise for a left hand turn and vice versa about a central axis of symmetry, and a pendulously moved horizon indicator co-axial with the turn indicator and comprising a meniscus of liquid level adapted to move angularly and symmetrically with the turn indicator, said meniscus comprising a transparently walled substantially circular annular capsule surrounding the indicator spindle of the turn indicator and positioned substantially concentric thereof, approximately half filled with indicating liquid and forming a background for comparative viewing of the turn indicator.

GEORGE HANCOCK REID.